(12) United States Patent
Hutchinson

(10) Patent No.: US 7,713,652 B2
(45) Date of Patent: May 11, 2010

(54) SINGLE POINT BATTERY WATERING SYSTEM WITH PIVOT FLOAT AND BALL VALVE

(75) Inventor: William L. Hutchinson, Hawley, PA (US)

(73) Assignee: Liquid Precision, Inc., Newfoundland, PA (US)

( * ) Notice: Subject to any disclaimer, the term of this patent is extended or adjusted under 35 U.S.C. 154(b) by 951 days.

(21) Appl. No.: 11/499,302

(22) Filed: Aug. 3, 2006

(65) Prior Publication Data

US 2006/0269832 A1   Nov. 30, 2006

Related U.S. Application Data

(63) Continuation-in-part of application No. 11/071,384, filed on Mar. 3, 2005, now Pat. No. 7,556,056.

(51) Int. Cl.
*H01M 2/36* (2006.01)
(52) U.S. Cl. .................. 429/74; 429/76; 137/260
(58) Field of Classification Search .................. 429/64, 429/74, 76; 137/260
See application file for complete search history.

(56) References Cited

U.S. PATENT DOCUMENTS

| | | | | | |
|---|---|---|---|---|---|
| 1,471,362 | A | * | 10/1923 | Sartakoff | 137/260 |
| 4,353,968 | A | * | 10/1982 | Boyle | 429/64 |
| 5,090,442 | A | * | 2/1992 | Campau | 137/315.01 |
| 5,284,176 | A | * | 2/1994 | Campau | 137/260 |
| 5,832,946 | A | * | 11/1998 | Campau | 137/15.08 |
| 6,782,913 | B2 | * | 8/2004 | Campus | 137/260 |
| 7,029,786 | B2 | * | 4/2006 | Campau | 429/64 |

* cited by examiner

*Primary Examiner*—Gregg Cantelmo
(74) *Attorney, Agent, or Firm*—Riddle Patent Law; Charles L. Riddle

(57) ABSTRACT

A series of cell fill valves are interconnected by a series of hoses and T-connections, one to each battery cell. Each cell fill valve is controlled by a ball in a seat in a single fill opening. The ball is controlled by a float on a pivotable lever arm with an end finger which holds the ball up to admit water with the float down and allows the ball to lower onto the seat as the cell fills causing the float to rise to a shutoff level when the cell is filled to a desired level.

10 Claims, 5 Drawing Sheets

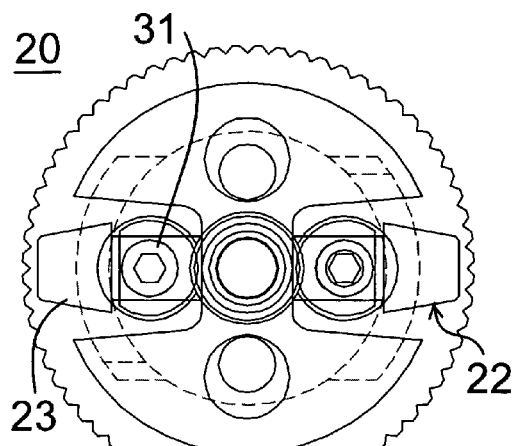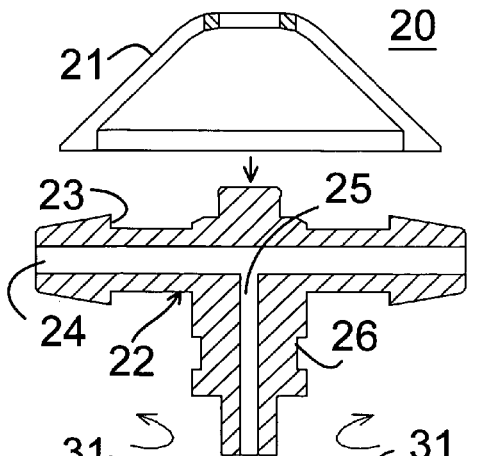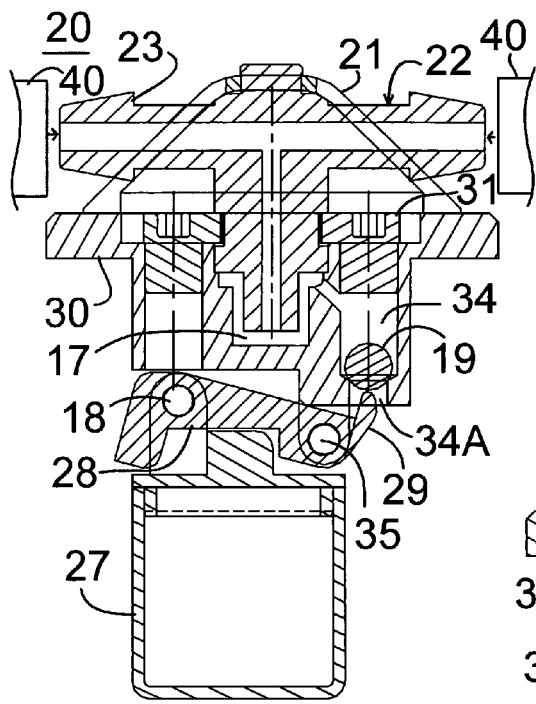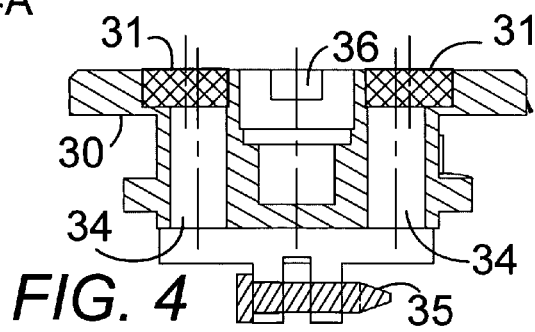
FIG. 1
FIG. 2
FIG. 3
FIG. 4

SINGLE POINT BATTERY WATERING SYSTEM WITH PIVOT FLOAT AND BALL VALVE

CROSS-REFERENCE TO RELATED APPLICATIONS

This is a continuation-in-part of U.S. utility patent application No. 11/071,384, filed Mar. 3, 2005 which is now U.S. Pat. No. 7,556,056 issued Jul. 7, 2009.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to single point fluid supply systems for replenishing a liquid electrolyte in a plurality of batter cells simultaneously and in particular to a series of cell fill valves interconnected by a series of hoses and T-connections, one to each cell, each cell fill valve controlled by a ball in a seat in a single fill opening, the ball controlled by a float on a pivotable lever arm with an end finger which holds the ball up to admit water with the float down and allows the ball to lower onto the seat as the cell fills causing the float to rise to a shutoff level when the cell is filled to a desired level.

2. Description of Related Art Including Information Disclosed Under 37 CFR 1.97 and 1.98

Single Point Battery Watering is primarily used for batteries on industrial lift trucks, golf carts and other battery powered vehicles. It involves placing some sort of automatic shutoff valve in every cell of the battery. These cells are then connected by a pipe or tubing. One end of the tubing is left free with a quick connect attached to it. When it is time to water the battery, a pressurized water supply line (hose) is attached to the quick connect. Water flows through the tubing and into the battery cells. As the cells reach the predetermined height, the valves shut off. Water is still able to flow through the tubing until all valves in the battery have shut off. The quick connect is detached and the next battery can be filled.

U.S. Pat. No. 1,942,908, issued Jan. 9, 1934 to Swain, concerns a liquid feeding mechanism for supplying fluid to multiple battery cells from one fluid source. Each cell is equipped with a float that raises a lever, which in turn lowers a valve to open the inflow aperture, thereby adding fluid to the cell. When the liquid level rises to the predetermined level, the float rises and the lever causes the valve to close the inflow aperture automatically.

U.S. Pat. No. 4,751,156, issued Jun. 14, 1988 to Olimpio, indicates a cap for accumulators suited for the automatic refill of distilled water that includes a main body inside which there is a chamber suited for the distribution of the distilled water through a hole. The hole is shut by a valve controlled by a float and connected to the float by means of a toggle joint. The toggle joint consists of a right-angled lever and of a shaft connected by a hinge to the lever and to the valve. The toggle joint ensures a very high force for the shutting of the valve, such as to stand high deliveries of liquid even under pressure. The cap is also equipped with a float in the shape of an upside-down glass, that is, open at the bottom on the side of the liquid upper surface, so that the push on the float is determined by the over-pressure of the air and the gasses contained in the interior of the float. The overpressure increases in direct relation to the rising of the electrolyte level. The gasses which develop inside the accumulator are discharged through a cap equipped with radial holes and with a ceramic filter suited to the expansion of the gasses.

U.S. Pat. No. 5,803,138, issued Sep. 8, 1998 to Oschmann, is for a device that serves to automatically fill battery cells with water, which includes a filler plug that can be placed in the cell. The plug has two connection members for the water supply as well as a valve operated by a float. The valve body is connected in articulated fashion to the float, which is arranged centrally in the plug housing, via a pivotally mounted amplifying lever. Between the valve with the valve body and the connection member there is a substantially vertical overflow wall with a free upper edge that is higher than the horizontal upper edge of the bore of the connection members so that a U-shaped feed duct is formed that leads to the overflow wall.

U.S. Pat. No. 4,386,141, issued May 31, 1983 to Weidner, indicates a watering device for maintaining a predetermined electrolyte level in the cells of a battery. The device includes a plug body consisting of a cover, a valve housing and a float guide. A valve is disposed within the body to modulate the quantity of water entering each cell. A float movably communicates with the valve. A visual indicator indicates the status of the device.

U.S. Pat. No. 4,749,633, issued Jun. 7, 1988 to Elias, concerns an automatic battery watering device, which includes a housing mounted in the battery cell opening. The housing has a chamber for receiving pressurized water, an internal valve opening for passing the water into the cell, a valve pin mounted in the valve opening, a float that is mounted in the battery electrolyte and connected to the lower end of the pin so as to rise and fall in response to a change in the liquid level in the cell, and a pair of internally mounted diaphragms which center and support the pin and float. The pin has a valve member for blocking the internal valve opening when the float is at an appropriate level. When the float is lowered after a drop in the level of the electrolyte, the internal valve member opens so water can flow into the battery to replenish the liquid level. The housing passes gas from the battery to the atmosphere along a path independent of the water passage.

U.S. Pat. No. 4,512,378, issued Apr. 23, 1985 to Oschmann, provides a device for the automatic filling of battery cells with water, which comprises a filling cup to be inserted into a battery cell and is provided with a connection hose for the water supply as well as a valve actuated by a float fitted to a single centering guide rod for easy movement and not susceptible to clogging up, the rod extending through an opening in the bottom of the cup housing and hinged at its upper end to an amplifying lever for the transmission of the float movement to the valve body, so that even in the remote possibility of heavy movement of the float guide, the lifting force of the float is sufficient to actuate the valve.

U.S. Pat. No. 1,471,362, issued Oct. 23, 1923 to Sartakoff, puts forth a storage battery filler that automatically adds fluid to the cells of a battery. Each cell is equipped with a float that activates a valve raising lever when the fluid level is low, the lever further serves to allow the valve to be seated when the liquid level rises to the predetermined level, thereby stopping the inflow of liquid.

U.S. patent application Ser. No. 20040161661, published Aug. 19, 2004 by Campau, illustrates a single point watering system for use with a lead-acid battery having a plurality of battery cell access ports. The system comprises a plurality of refill valves and a plurality of refill valves and a manifold having (i) a water feed tube with at least one external port and a plurality of outlets each communicating with one of the plurality of refill valves, and (ii) at least one passageway housing a flame arrestor to permit the discharge of gases from the battery cells to the surrounding environment only through the flame arrestor. The manifold is removably and sealably mountable to the battery so that each refill valve is in fluid communication with one of the battery cell access ports.

U.S. patent application Ser. No. 20040140005, published Jul. 22, 2004 by Campau, provides a single point watering system for refilling individual cells of a multi cell monobloc lead-acid battery wherein each battery cell is fitted with a refill control valve. The system includes a manifold and a swivel connector fitting. The manifold has (i) a plurality of outlet bosses positioned at a predetermined spacing to permit the manifold to be assembled to the battery with each outlet boss in sealed fluid communication with one of the refill control valves, (ii) at least one inlet port adapted to receive the swivel connector fitting, and (iii) a longitudinally extending passageway for fluid communication between the inlet port and each outlet boss. The swivel connector fitting has an outlet boss which is mounted within the manifold inlet port in sealed fluid communication and is rotatable within the inlet port through 360 degrees. The swivel connector fitting also includes ports to communicate with other components of the single point watering system.

U.S. Pat. No. 5,090,442, issued Feb. 25, 1992 to Campau, provides a field repairable apparatus for filling a container to a predetermined level with liquid provided from an external liquid supply means. The apparatus includes a main valve and a main valve seat for controlling the supply of liquid to the container. A lower valve housing is provided for supporting the main valve and main valve seat. An upper cap housing is also provided which is in fluid communication between the external liquid supply means and the main valve. Together, the lower and upper housings form a manually releasably connected valve assembly which is removably insertable into the container.

U.S. Pat. No. 6,644,338, issued Nov. 11, 2003 to Campau, shows a single point watering system for refilling individual cells of a multi cell monobloc lead-acid battery wherein each battery cell is fitted with a refill control valve. The system includes a manifold and a swivel connector fitting. The manifold has (i) a plurality of outlet bosses positioned at a predetermined spacing to permit the manifold to be assembled to the battery with each outlet boss in sealed fluid communication with one of the refill control valves, (ii) at least one inlet port adapted to receive the swivel connector fitting, and (iii) a longitudinally extending passageway for fluid communication between the inlet port and each outlet boss. The swivel connector fitting has an outlet boss which is mounted within the manifold inlet port in sealed fluid communication and is rotatable within the inlet port through 360 degrees. The swivel connector fitting also includes ports to communicate with other components of the single point watering system.

U.S. Pat. No. 4,527,593, issued Jul. 9, 1985 to Campau, discloses an apparatus and system for filling containers with a required liquid to a predetermined level. The apparatus includes a main valve means for controlling the flow of liquid through the apparatus and into the container; a fluid amplifier means for receiving at least a portion of the liquid from the main valve means and for generating a pressure signal until such time as the liquid within the container reaches the predetermined level; and pilot valve means for maintaining the main valve means open in the presence of the pressure signal from the fluid amplifier and for closing the main valve means in the absence of the pressure signal. The system includes the aforesaid apparatus together with liquid supply conduit and valve means.

U.S. Pat. No. 6,227,229, issued May 8, 2001 to Campau, puts forth a high gain fluid control valve assembly, which includes a body portion having one or more inlets and two aligned outlets. The outlets are located on opposing faces of the body portion, one having a generally rigid valve seat defining a first valve outlet port and the other having a generally flexible valve seat defining a second valve outlet port. The valve assembly also employs a valve support assembly configured to move relative to the body portion generally along the axis of the aligned outlets. The support assembly has a flexible valve member at one end positioned inside the body portion and configured to engage the rigid valve seat to block flow through the first valve outlet port. The support assembly also has a generally rigid valve member positioned outside the body portion and configured to engage the flexible valve seat to block flow through the second valve outlet port. With this construction, when the valve support member is in an open position, both the flexible and rigid valve members are spaced from the rigid valve seat and flexible valve seat, respectively, allowing flow of fluid through the valve. However, when the valve support assembly is moved to the closed position, both the valve members are in contact with their respective valve seats and fluid flow is blocked.

U.S. Pat. No. 5,048,557, issued Sep. 17, 1991 to Campau, shows an apparatus used in a system for filling containers with a required liquid to a predetermined level. The apparatus includes a main valve means for controlling the flow of liquid through the apparatus and into the container. This main valve means includes an improved main valve, an improved main valve seat, and a main valve support.

What is needed is a simple low cost single point fluid supply system for replenishing a liquid electrolyte in a plurality of batter cells simultaneously with very few parts, of which very few are moving parts and none of the parts made of rubber, which can get sticky in the battery environment and cause failures.

BRIEF SUMMARY OF THE INVENTION

An object of the present invention is to provide a simple low cost single point fluid supply system for replenishing a liquid electrolyte in a plurality of batter cells simultaneously with very few parts, of which very few are moving parts and none of the parts made of rubber, which can get sticky in the battery environment and cause failures, wherein a float in the battery cell moves a lever arm with an end finger to raise and lower a ball in a seat in a single fluid passageway between the liquid electrolyte source and each battery cell to control the flow of the liquid electrolyte into the battery cell.

The valve of the present invention is structured primarily to provide a simple means for simultaneous filling of the water level of all cells in the eighteen or twenty-four cell battery packs found on golf carts, fork lifts and various other mobile electric devices. Uses for filling other containers and different multiples are possible.

Basically one of these valves is inserted in each cell and a flexible tubing connects all these valves to a common pressurized water (or whatever liquid) supply. When the pressurized supply is opened, any cell that needs water will be filled until the float attached to the valve of the present invention stops the water flow when the proper level is reached.

Yet another object of the present invention is to provide an o-ring on the base of the tee instead of relying on an interference fit to seal against supply pressure.

Still another object of the present invention is to provide two interference fit plugs located 180 degrees apart on either side of the tee to hold the tee in place against supply pressure and against any force applied that might pull it out, wherein one plug serves as a cap for the ball chamber, and the other is in a blind hole.

A further object of the present invention is to provide a lower cost product with fewer moving parts than competitive products on the market.

A significant object of the present invention is to control liquid electrolyte flow of sufficient pressure and volume to accomplish filling a number of battery cells simultaneously in a reasonable time with only the buoyancy of a float that can fit into the cell as the controlling force.

An object of the present invention is to provide a float rod, connecting an offset float to the lever arm, which float rod is molded long so it can be cut to whatever length needed at assembly to produce a valve set which will achieve a desired fill level without need to change the float.

Another related object of the present invention is to provide a removable float in the valve so that the shutoff level of the float can be changed by varying the height, diameter, and/or weight of the float which is very helpful for achieving correct fill levels in different types of batteries and containers.

Yet another object of the present invention is to provide a sensitive adjustment between the float and the ball, since the force of the water flowing against the ball and against the exposed area of the finger on the lever will modify shutoff levels, variations in ball and finger dimensions can be used to design valves for a demonstrated 1 to 40 psi range of the existing valve, wherein a thinner pointed lever and/or smaller ball will allow a higher shutoff level while a wider pointed lever or bigger ball will yield a lower shutoff level.

A further object of the present invention is top provide a resized connection port between the cavity under the tee and the cavity containing the ball as another demonstrated method for varying the fill level, fill rate and fill level repeatability of the valve.

One more object of the present invention is to drill the connection port horizontally from the outside of the body completely through the ball chamber and then use a round piece of left over float rod to plug the portion of the drilled hole between the ball cavity and the outside of the body so that this piece of rod is cut to extend partially across the ball cavity and serves to restrict the ball from ever moving up in the cavity too far where the incoming flow stream could support it independently of the finger resulting in failure of the valve to shut off, and the piece of rod also acts as a plug which facilitates sealing the hole between the ball cavity and the outside of the body.

Another related object of the present invention is to provide a lever shape which includes a foot, in one embodiment, which holds the float in a nearly vertical orientation when it is not supported by any buoyancy forces, which foot and the resultant orientation of the free hanging float are crucial to the direction of force application when the water lifts the float.

A related object of the present invention is to provide a surrounding cage fixed to the body of the valve so that the orientation of the float is maintained by the surrounding cage, which also provides an interference free area of operation for the float within the battery cell, and should the moss plate or any other object within a battery cell be in a position that would interfere with float operation the cage will either force the object to move or prevent insertion of the valve into the cell.

Another related object of the present invention is to provide a cage structure which allows for inclusion of cage extension rings between the cylindrical upper portion and the cap at the bottom, so that no extension rings are used for the highest fill level valves (shortest float rod lengths), and as deeper fill levels are needed one or more extension rings are included to increase the depth of the cage.

Yet one more object of the present invention is to position the location of the finger on the lever lifting the ball so that it causes the highest flow of water to come out on either side of the finger where it deflects off the ball cavity seat and streams out away from the center of the body so that most of the flow is thus directed out of the cage and does not impinge on the float.

Still another object of the present invention in another embodiment is to form the fluid transfer port connecting the center water passage from the base of the T-connector into the ball cavity by molding it into the body at a 45 degree angle to eliminate the drilling operation and the need to plug the hole between the ball cavity and the outside of the body to significantly reduce assembly time and at the same-time provide a positive influence on valve performance due to much more consistent size and positioning of the molded port over the drilled port.

A related object of the present invention is to mold an extension on the plug that caps off the ball cavity so that the extension extends down far enough to restrict excessive upward travel of the ball in the same manner the round piece of left over float rod did in the design described above so that there is no need to offset the port location from the centerline of the body to create a vortex flow.

In brief, the float of the present invention is attached via a float rod to a pivotable lever arm with a finger at one end which moves up and down to raise or lower a ball resting in a seat in a small opening between the liquid source and the cell of the battery. As the liquid electrolyte level in the cell lowers, the float lowers and tilts the lever arm up so that the finger of the lever arm lifts the ball to admit fluid to flow around the ball through the opening into the battery cell. As the fluid is admitted to the battery cell, the fluid level in the cell rises to a desired amount which moves the float up to lower the lever arm so that the finger lowers the ball to fit into the seat to cover the opening when the fluid in the cell reaches the desired level to stop the flow of fluid into the cell.

The valve of the present invention is configured primarily to provide a simple means for simultaneous filling of the water level of all cells in the eighteen or twenty-four cell battery packs found on golf carts, fork lifts and various other mobile electric devices. Uses for filling other containers and different multiples are possible.

Basically one of the valves of the present invention is installed in each cell and flexible tubing connects all the valves to a common pressurized water (or whatever liquid) supply. When the pressurized supply is opened, any cell that needs water will be filled until the float attached to the valve stops the water flow when the proper level is reached. The control water (liquid) flow is of sufficient pressure and volume to accomplish the fill in a reasonable time with only the buoyancy of a float that can fit into the cell as the controlling force used to move a lever arm which lifts and lowers a simple ball is a seat in a single fluid passageway into the battery cell from the fluid supply.

The pair of interference plugs are stepped up to a larger diameter at the top and sit in counterbored holes such that their top surface is flush with the top of the valve body. The upper portion of the plugs include a chamfered notch on the OD such that when rotated to the proper orientation they allow insertion of the tee into the body with the chamfer providing a lead in for the o-ring. With the tee in place the two plugs are then rotated approximately 180 degrees such that the un-notched portion moves into a groove in the tee effectively locking the tee in place vertically yet allowing it to rotate freely. The force balance is such that attempting to force the tee out of the body tends to cock the plugs in their holes making it impossible for the liquid supply pressures even well beyond the rating of the system to push out the tee or for the tee to be pried out from above by mechanical force.

The main advantages of the present invention over the competition include simplicity and cost. The present invention has very few parts, of which very few are moving parts. None of the parts are made of rubber, which can get sticky in the battery environment and cause failures. Nor are there any metallic components which can introduce corrosive or contamination issues. The present invention provides an advantageous cost savings over the competition. Another significant advantage is the shape and very low profile of the portion of the valve assembly extending above the battery cell where the tubing connections are made. The tee connectors on top of the valve are for relatively small (3/16" ID) tubing and are as low to the top of the battery case as possible. This combined with the conical cover that snaps over the tee greatly reduces the likelihood that the tops of the valves or the water supply tubing will snag and be damaged as the battery cables are dragged over the top of the battery when being disconnected or reconnected for charging or other purposes.

Another significant advantage of the present invention is the shape and very low profile of the portion of the valve assembly extending above the battery cell where the tubing connections are made because the tee connectors on top of the valve are for relatively small (3/16" ID) tubing and are as low to the top of the battery case as possible and also because the conical cover that snaps over the tee greatly reduces the likelihood that the tops of the valves or the water supply tubing will snag and be damaged as the battery cables are dragged over the top of the battery when being disconnected or reconnected for charging or other purposes.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings:

These and other details of my invention will be described in connection with the accompanying drawings, which are furnished only by way of illustration and not in limitation of the invention, and in which drawings:

FIG. 1 is a top plan view of one of the valves of the present invention;

FIG. 2 is a center cross-sectional view through one of the valves of the present invention with the float raised to a desired level of fluid in a battery cell so that the finger on the lever arm has moved downward to allow the ball to lower onto the seat and block the opening to stop the flow of fluid;

FIG. 3 is a center cross-sectional exploded view of one of the valves of the present invention with the components of one of the valves aligned for assembly showing the float in a lowered position, such as when the fluid level in the cell has dropped to lower the float and tilt the lever arm up so that the finger is lifting up the ball from the seat to allow fluid to flow through the opening into the cell and showing the T-connection which has a horizontal passageway between two hose connectors for sections of hose to connect valves together and attach to a fluid supply;

FIG. 4 is a center cross-sectional view taken through the body of the valve with two vent passages that prevent gas pressure buildup in the cells by allowing the gas to vent through two porous industry standard plastic flame arresters to allow the gas to vent out of the battery cell, but prevent a flame from passing through the arrester and into the cell;

DETAILED DESCRIPTION OF THE INVENTION

Figure 5:
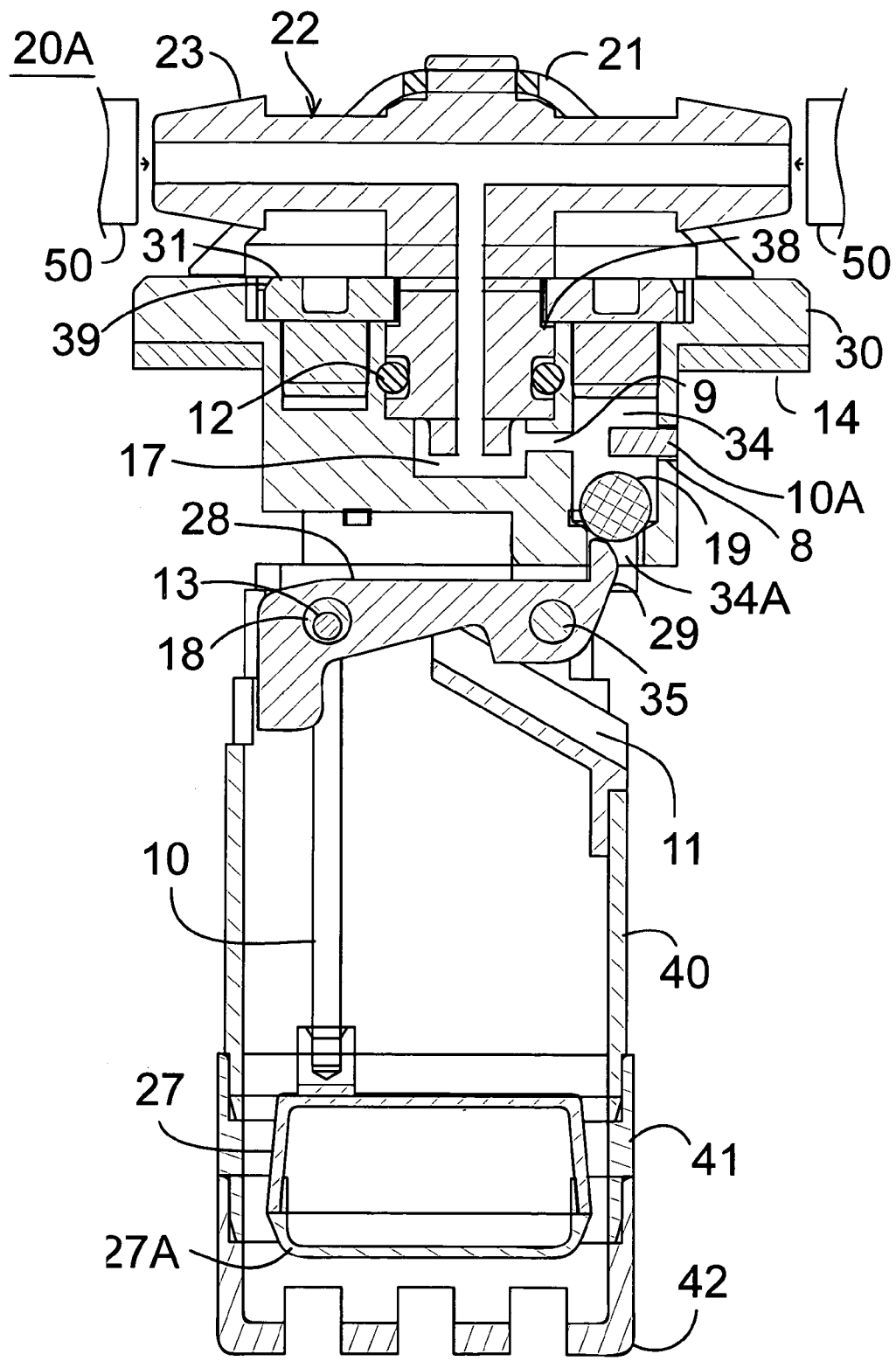
FIG. 5 is a cross-sectional view of the invention taken through 5-5 of FIG. 7 showing alternate structures including a float rod, a ball movement limiter, O-ring, and interference fit plugs to hold down the T-connection while permitting rotation.

In FIGS. 1-8, a single point fluid supply system for replenishing a liquid electrolyte in a plurality of batter cells simultaneously comprises a plurality of cell fill valves 20 and 20A interconnected by a plurality of fill hoses 40 and T-connections 22 to a battery cell fluid supply flowing at any of a range of pressures through the system, one of the cell fill valves to each battery cell.

Each of the cell fill valves 20 comprises a single fill opening 34 controlled by a ball 19 in a seat 34A. A lever arm 28 pivots about a pivot point 35. The lever arm comprises a float 27 on a first end of a pivot arm and an end finger 29 on a second end of the pivot arm, the lever arm controlling the ball 19 in the seat 34A. The finger 29 points upwardly with the float in a first downward position when the battery cell fluid level is low in a battery cell, as in FIG. 3. The upward pointing finger 19 thereby holds the ball 19 up off the seat 34A to admit a flow of battery cell fluid into the cell below. As the float 27 is lifted by battery cell fluid as the battery cell is filling the float 27 elevates the finger 29 is lowered until the battery cell is filled to a valve shutoff level and the finger 29 is sufficiently low to lower the ball 19 onto the seat 34A to stop the flow of battery cell fluid into the battery cell, as in FIGS. 2 and 5.

The float 27 is replaceable and the shutoff level of any of the valves can be changed by installing a different length float rod or different size or weight of float thereby changing the height of the float in the battery cell fluid in the battery cell to enable achieving correct fill levels in different types of batteries and containers.

The lever arm 28 is replaceable and the shutoff level of any of the valves can be changed by installing a lever arm having a finger 29 of a different size thereby lowering the ball into the seat at different levels of the battery cell fluid in the battery cell to enable achieving correct fill levels in different types of batteries and containers.

The ball 19 is replaceable and the shutoff level of any of the valves can be changed by installing a ball of a different size thereby lowering the ball into the seat at different levels of the battery cell fluid in the battery cell to enable achieving correct fill levels in different types of batteries and containers.

The buoyancy of the float 27 alone is sufficient to shut off the valve without assist from the pressure of the battery cell fluid flow at a higher final level shut off level of battery cell fluid in the batter cell than it would shut off with an optimum desired pressure of battery cell fluid flowing through the system to act as a safety backup should an insufficiently pressurized supply of battery cell fluid be used.

The pivot point 35 of the lever arm 28 is positioned to the side of the single fill opening 34 so that the float 27 is positioned away from the single fill opening 34 so that the battery cell fluid flowing into the battery cell does not flow down onto the float 27.

The float 27 is attached to the lever arm 28 by a float pivot 18 so that the float 27 hangs downwardly from the lever arm 28 and the float 27 remains in a vertical position during movement of the lever arm.

A cover 21 fits over the valve to shield the valve from damage from external elements, such as the fill hoses, and from external fluids. Both the cover 21 and the T-connection 22 are structured to swivel 360 degrees to ease routing of tubing on the battery.

An annular retainer passage 17, formed around and under the bottom of the T-connection, for battery fluid communicates between the T-connection and the single fill opening at a level below a top of the single fill opening 34 so that the retainer passage retains some battery fluid after the battery cell reaches the shutoff level to function as a water seal to prevent gas from migrating up out of the battery cell and eliminate a potential hazard of a flame in one battery cell spreading to other battery cells via flammable gas in the fill hoses.

At least one, and preferably two, vent passages 31 each with a porous flame arrester communicate between the valve and outside air to allow gas to vent and prevent gas pressure buildup in the battery cell.

In FIG. 5, a connection port 9 between a cavity 17 under the T-connection 22 and the ball chamber 34 may be resized as a means for varying the fill level, fill rate and fill level repeatability of each of the cell fill valves. The connection port 9 is preferably positioned in an offset location of the connection port 9 relative to a side of the ball cavity 34 so that a liquid stream coming into the ball cavity impinges on a tangent to the cavity wall to create a circulating or vortex flow path within the ball cavity.

Figure 6:
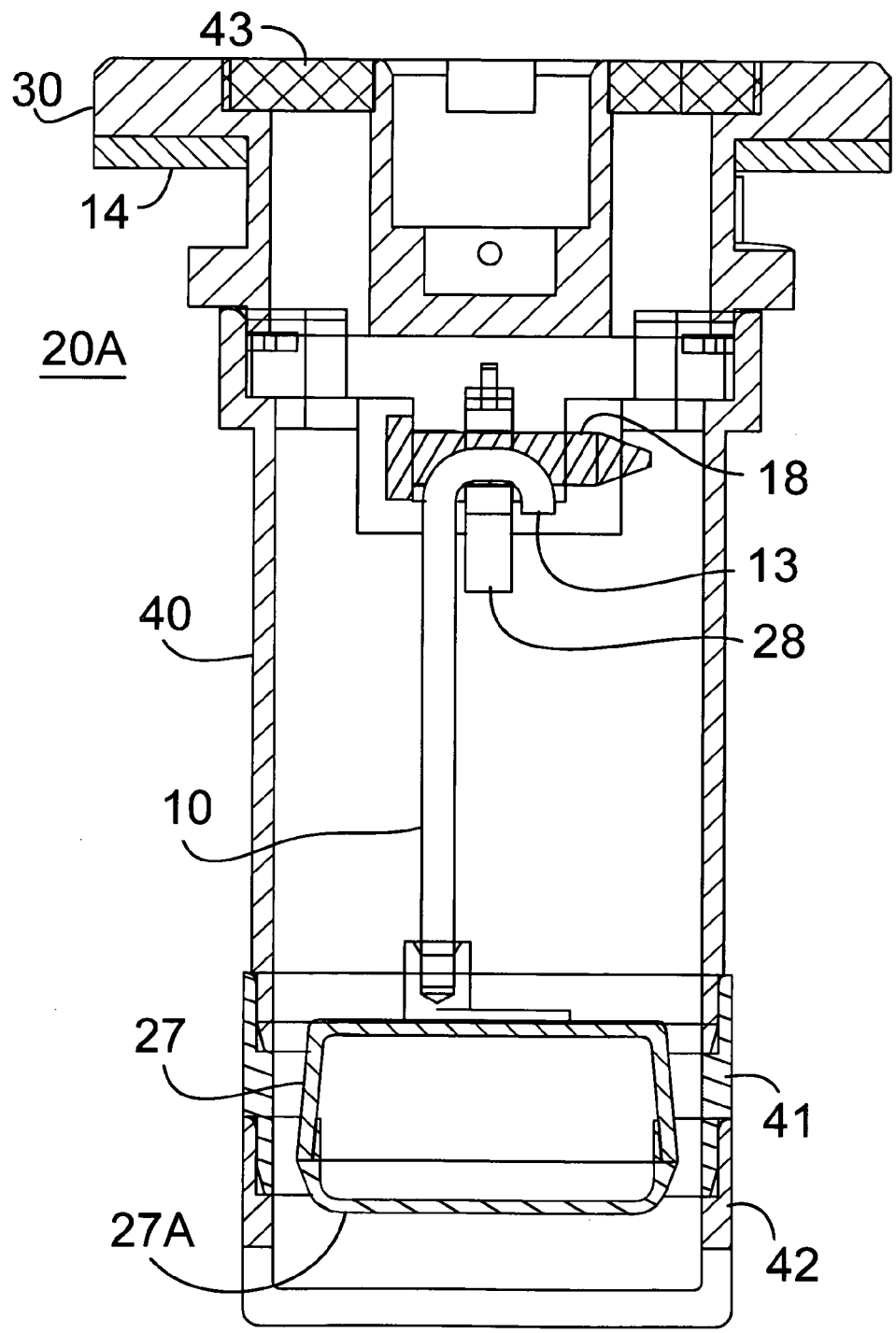
FIG. 6 is a cross-sectional view of the invention of FIG. 5 taken through 6-6 of FIG. 7 showing how the float rod connects with the lever arm.
Figure 7:
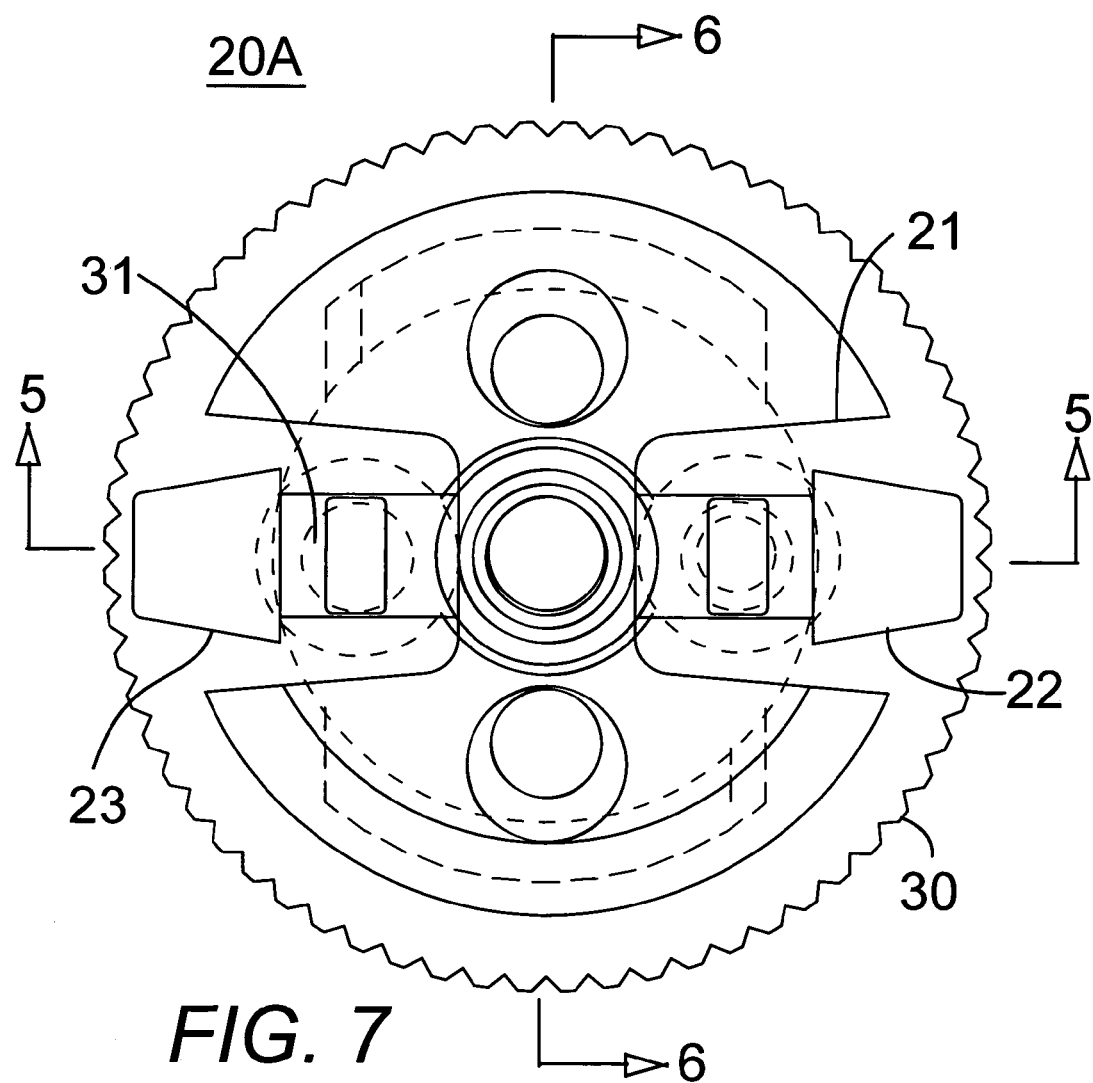
FIG. 7 is a top plan view of the invention of FIG. 5.

In FIGS. 5 and 6 a cage 40 is structured around the float 27 to maintain the orientation of the float and to provide an interference free area of operation for the float within the battery cell. The cage 40 has a diverter component 11 attached to the inside of the cage, as shown in FIG. 5 to deflect the discharge stream toward the outside of the cage to further reduce impingement as a means for improving repeatability of the fill level of the valve. The cage 40 is structured as a two part interconnected cage, the main cage 40 and a bottom removable bottom cap 42, which can sandwich at least one of a series of extension rings 41 interconnected to increase the depth of the cage for deeper fill levels. No extension rings are used for the highest fill level valves (shortest float rod lengths), as deeper fill levels are needed one or more extension rings are included to increase the depth of the cage.

In FIGS. 5 and 6, a float rod 10 is attached between the float 27 and the lever arm 28. The float rod 10 comprises an elongated rod which is configured to be cut to whatever length needed at assembly to produce a valve set of the base float height and valve which will achieve a desired fill level without need to change the float.

In FIG. 5, a connection port 8 extends horizontally through an outer wall of the ball chamber 34 and a cylindrical piece 10A cut off of the float rod 10 is inserted into the connection port as a plug. The cylindrical piece 10A of the float rod extends partially across the ball cavity 34 to restrict the ball from moving up in the ball cavity too far so that the incoming flow stream can not support it independently of the finger resulting in failure of the valve to shut off.

In FIG. 5, an O-ring 12 is fitted onto a base of the T-connection 22 for positive sealing and a pair of interference fit plugs 31 are located one on each of two opposing sides of the T-connection, positioned in a pair of counter-bored holes in a top of the valve body so that a top surface of each of the plugs is flush with the top of the valve body. An upper portion of each of the plugs including a chamfered notch 39 on an outer edge so that when each of the plugs is in a first orientation the chamfered notch on each of the plugs allows insertion of the T-connection 22 into the body with the chamfer providing a lead in for the O-ring, and alternately with the T-connection in place, the two plugs in a second orientation, each rotated approximately 180 degrees facing away from the T-connection, as shown in FIG. 5, an opposite un-notched portion of each of the plugs fits within a groove 38 in the T-connection effectively to lock the T-connection in place vertically while allowing the T-connection to rotate freely. The force balance is such that attempting to force the tee out of the body tends to cock the plugs in their holes making it impossible for the liquid supply pressures even well beyond the rating of the system to push out the tee or for the tee to be pried out from above by mechanical force.

Figure 8:
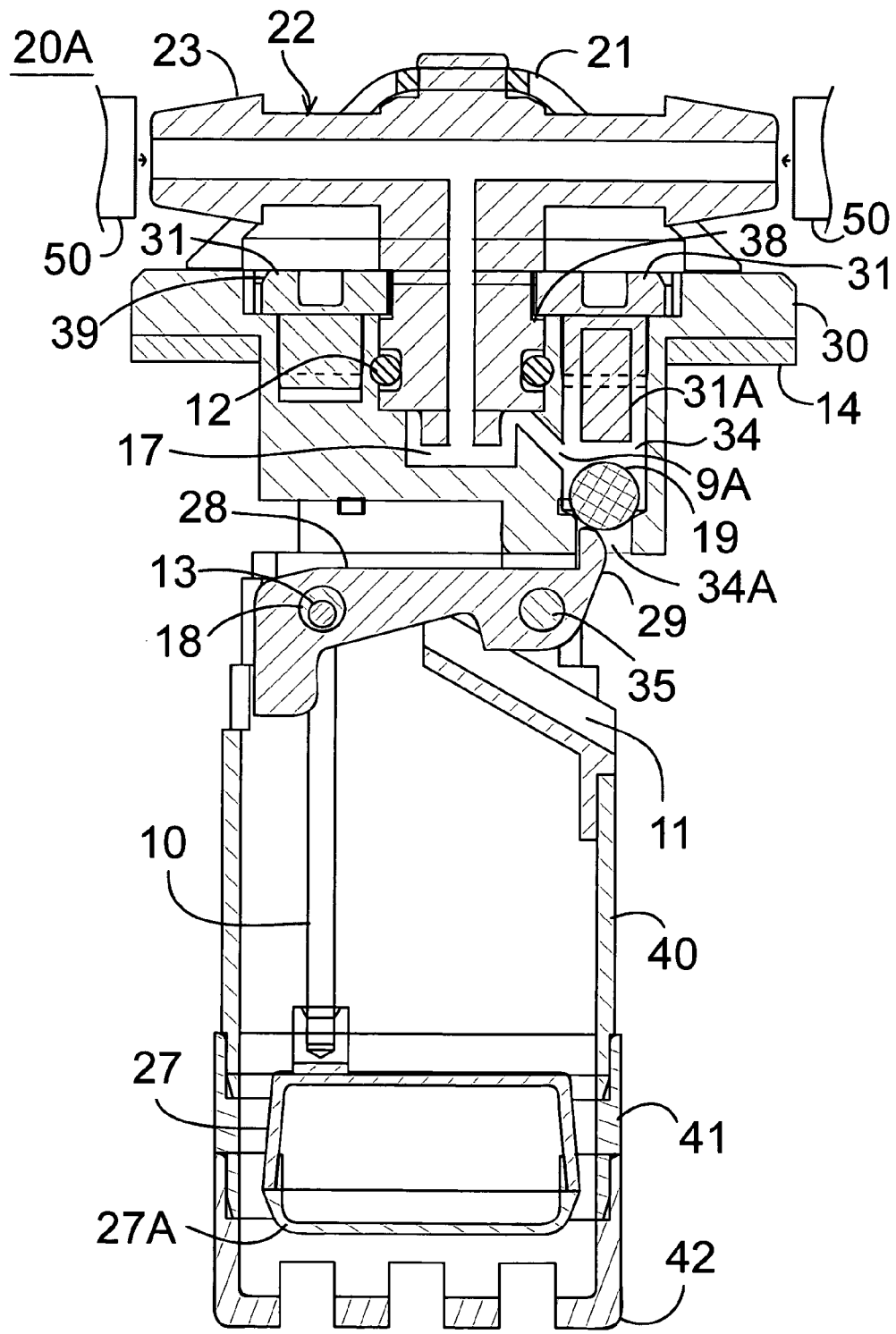
FIG. 8 is a cross-sectional view of a preferred embodiment of the invention taken through 5-5 of FIG. 7 showing alternate structures including a float rod, O-ring, interference fit plugs to hold down the T-connection while permitting rotation, an extension of one of the plugs as a ball movement limiter, and an angled fluid transfer port into the ball chamber.

In FIG. 8, a preferred angled fluid transfer port 9A connects the center water passage 17 from the base of the T-connector 22 into the ball cavity 34, the fluid transfer port formed in the system by molding it into the body at a 45 degree angle from vertical to significantly reduce assembly time and to provide a positive influence on valve performance due to a more consistent size and positioning of the molded port.

One of the plugs 31, a ball chamber plug, is threaded into the ball chamber and further comprising a bottom extension 31A on the ball chamber plug so that the bottom extension extends down a sufficient distance into the ball chamber to restrict excessive upward travel of the ball 19.

The system is preferably constructed of molded plastic with the lever arm, float, and ball being the only moving parts and with no rubber parts.

In use, with the valve in the open position as in FIG. 3, battery cell fluid such as water or other liquid electrolyte, from a 10 to 35 psi regulated water or other liquid electrolyte supply, is piped through 3/16" tubing or hose 40. This tubing is connected to the hose T-connector 22 using hose connector ends 23 on each individual valve. Water flows from a section of tubing 40 into the T-connector 22 through the horizontal opening 24; some goes down the stem 26 through the stem opening 25 into the valve and the remaining flow will continue onward through the horizontal opening 24 to another section of tubing 40 to feed other identical float valves. Not all valves have to be piped in series.

The battery cell fluid goes down the stem 26 of the valve through the vertical opening 25, then out and back up through an annular passage 17 (U shaped in the two dimensional figure) and then back down through a port (45 degree angle) into a cylindrical cavity forming the single fill opening 34 which contains a ball 19 (preferably 5/32" in diameter). At the bottom of the cylindrical cavity is a seat 34A that allows the ball 19 to stop water flow. In the position shown in FIG. 3, the ball 19 is held above this seat 34A by a small finger 29 on the end of the lever 28. The other end of the lever is attached to the float 27.

With the finger 19 in this position, water or other battery cell fluid flows through the cylindrical cavity 34, around the ball 19 and into the battery cell or container. As water or other battery fluid flows in, the battery fluid level rises in the battery cell. The friction of the water flowing over the ball, the finger and the differential pressure created by the weight of the water on each apply a load to the lever which acts to try and lift the float. But without the buoyancy of the water acting on the bottom of the float the force is insufficient to lift the float. Once the water level in the cell or container rises to the point where it provides lift to the float, the lever moves, and the finger retracts down slightly. This increased restriction on the water flow over the ball increases the force applied to that end of the lever and the effect is that the ball pushes the finger completely down and the ball seats and stops the water flow, as in FIG. 2. This container is now filled to the pre-determined level and the remaining water flowing in the tubing 40 will complete filling in other battery cells or containers.

When all the containers or cells are filled there will be no more water flow at the supply indicating that the process is complete. The operator simply disconnects the supply. After the supply pressure has been removed, water will slowly leak around the close tolerance, but not pressure sealed, swivel neck of the tee connector allowing any residual pressure to bleed off. Then the ball will no longer be held tightly against its seat and water in the system will eventually drain out under the ball into the containers or cells. Eventually as the cell or container loses water (liquid) the float weight will move the finger up under the ball and reset the valve for the next fill.

Even after all the water has drained down, the annular passage 17 in the center of the valve will still contain some water. This functions as a water seal (similar to a trap in a sink and prevents hydrogen gas (or any gas) from migrating up into the empty supply tubing. This water trap eliminates the potential hazard of a flame in one battery cell spreading to other cells via flammable gas in the tubing.

The valve design also provides two vent passages 31 that prevent gas pressure buildup in the cells by allowing the gas to vent through two porous plastic flame arresters. These flame arrestors are standard industry purchased items designed to allow the gas to vent out of the battery cell, but prevent a flame from passing through the arrester and into the cell.

Another feature of the valve design is the presence of a small angled cover 21 that snaps onto the top of the valve, above the cell and around the water supply tee. This cover holds the flame arrest shields in their cavities, protects them from dirt and thus eventual clogging, and also deflects water away from the battery cells during an external hose cleaning of the battery. The low profile and angled edges of the cap are designed to minimize damage to the float valve that typically can occur when battery cables or other potentially damaging items are dragged over the battery tops during normal operation or service. Both the cover 21 and the tee 22 are designed to swivel 360 degrees to ease the routing of tubing on the battery.

It is understood that the preceding description is given merely by way of illustration and not in limitation of the invention and that various modifications may be made thereto without departing from the spirit of the invention as claimed.

What is claimed is:

1. A low profile fluid supply system which does not snag on cables or other objects, for providing a liquid to a plurality of battery cells each having a top surface and a battery cell hole in the top surface, each cell also containing an internal fluid, the system comprising:
   a. a fluid reservoir for holding a fluid,
   b. a plurality of automatic valves each fitting at least partially into the cell hole, such that only a small portion is exposed outside of the cell hole, the exposed portion begin covered by a generally smooth curved helmet, designed to reduce the possibility of cables and other objects from getting caught on the automatic valves, the automatic valves operating to sense when the battery cell internal fluid drops below a predetermined level, and allows a fluid provided to it to fill the battery cell until it reached a predetermined level;
   c. a plurality of fill hoses adapted to provide fluid from the fluid reservoir to each of the automatic valves.

2. The low profile fluid supply system of claim 1, wherein the helmet has a generally circular periphery and is higher in its center to enclose the exposed automatic valve, and drops to become generally flush with the top of the battery cell at its periphery.

3. The low profile fluid supply system of claim 1, wherein the helmet is removable to allow access to the valve parts.

4. The low profile fluid supply system of claim 1, wherein the helmet is designed to snap in place.

5. The low profile fluid supply system of claim 1, wherein the helmet has openings to allow the fill hoses to connect to the automatic valve.

6. A low profile fluid supply system which does not snag on cables or other objects, for providing a liquid to a plurality of battery cells each having a top surface and a battery cell hole in the top surface, each cell also containing an internal fluid, the system comprising:
   a. a fluid reservoir for holding a fluid,
   b. a plurality of automatic valves each fitting at least partially into the cell hole, such that only a small portion is exposed outside of the cell hole, designed to reduce the possibility of cables and other objects from getting caught on the automatic valves, the automatic valves operating to sense when the battery cell internal fluid drops below a predetermined level, and allows a fluid provided to it to fill the battery cell until it reached a predetermined level,
   c. a generally curved helmet adapted to provide a smooth, snag resistant covering surface to the exposed portion of the automatic valve, helmet having a portion designed to be substantially flush with the top surface of the battery around the automatic valve but smoothly raises to cover the exposed portion of the valve at a generally center point, and
   d. a plurality of fill hoses adapted to provide fluid from the fluid reservoir to each of the automatic valves.

7. The low profile fluid supply system of claim 6, wherein the helmet has a generally circular periphery and is higher in its center to enclose the exposed automatic valve, and drops to become generally flush with the top of the battery cell at its periphery.

8. The low profile fluid supply system of claim 6, wherein the helmet is removable to allow access to the valve parts.

9. The low profile fluid supply system of claim 6, wherein the helmet is designed to snap in place.

10. The low profile fluid supply system of claim 6 wherein the helmet has openings to allow the fill hoses to connect to the automatic valve.

* * * * *